(12) United States Patent
Horsley

(10) Patent No.: US 9,434,635 B2
(45) Date of Patent: Sep. 6, 2016

(54) TINTED FLOAT GLASS

(71) Applicant: Pilkington Group Limited, Lancashire (GB)

(72) Inventor: Martin James Horsley, Helsby (GB)

(73) Assignee: PILKINGTON GROUP LIMITED, Lancashire (GB)

(*) Notice: Subject to any disclaimer, the term of this patent is extended or adjusted under 35 U.S.C. 154(b) by 0 days.

(21) Appl. No.: 14/412,528

(22) PCT Filed: Jul. 16, 2013

(86) PCT No.: PCT/GB2013/051900
§ 371 (c)(1),
(2) Date: Jan. 2, 2015

(87) PCT Pub. No.: WO2014/013242
PCT Pub. Date: Jan. 23, 2014

(65) Prior Publication Data
US 2015/0329407 A1    Nov. 19, 2015

(30) Foreign Application Priority Data

Jul. 16, 2012 (GB) .................................. 1212609.0

(51) Int. Cl.
*C03C 3/087* (2006.01)
*C03C 4/02* (2006.01)

(52) U.S. Cl.
CPC .............. *C03C 3/087* (2013.01); *C03C 4/02* (2013.01); *C03C 2204/00* (2013.01)

(58) Field of Classification Search
CPC ........... C03C 3/087; C03C 4/02; C03C 4/08; C03C 4/082; C03C 4/085; C03C 17/002; C03C 17/2456; C03C 17/256; C03C 17/3417
See application file for complete search history.

(56) References Cited

U.S. PATENT DOCUMENTS

| | | | | |
|---|---|---|---|---|
| 3,723,142 A | * | 3/1973 | Kato | C03C 1/10 501/71 |
| 4,104,076 A | * | 8/1978 | Pons | C03C 1/10 501/66 |
| 4,339,541 A | | 7/1982 | Dela Ruye | |
| 4,866,010 A | | 9/1989 | Boulos et al. | |
| 5,070,048 A | | 12/1991 | Boulos et al. | |
| 5,264,400 A | * | 11/1993 | Nakaguchi | C03C 3/095 428/220 |
| 5,318,931 A | * | 6/1994 | Nakaguchi | C03C 3/095 501/27 |
| 5,763,342 A | * | 6/1998 | Mita | C03C 3/095 501/64 |
| 5,776,846 A | * | 7/1998 | Sakaguchi | C03C 3/095 501/69 |
| 5,958,811 A | * | 9/1999 | Sakaguchi | C03C 3/095 501/64 |
| 6,114,264 A | * | 9/2000 | Krumwiede | C03C 3/087 501/64 |
| 6,326,324 B1 | * | 12/2001 | Sakaguchi | C03C 3/095 501/64 |
| 6,498,118 B1 | * | 12/2002 | Landa | C03C 3/095 501/64 |
| 6,858,306 B1 | | 2/2005 | Strickler et al. | |
| 7,071,133 B2 | | 7/2006 | Arbab et al. | |
| 7,625,830 B2 | | 12/2009 | Shelestak et al. | |
| 7,863,208 B2 | | 1/2011 | Broughton et al. | |
| 7,932,198 B2 | | 4/2011 | Hulme et al. | |
| 8,268,741 B2 | | 9/2012 | Heithoff et al. | |
| 8,455,066 B2 | | 6/2013 | Heithoff et al. | |
| 8,669,197 B2 | | 3/2014 | Broughton et al. | |
| 2004/0077479 A1 | | 4/2004 | Coster et al. | |
| 2004/0116271 A1 | * | 6/2004 | Thomsen | C03C 3/095 501/71 |

(Continued)

FOREIGN PATENT DOCUMENTS

| | | |
|---|---|---|
| EP | 1462244 A1 | 9/2004 |
| GB | 2304710 A | 3/1997 |
| SB | 1331492 | 9/1973 |

OTHER PUBLICATIONS

International Search Report (PCT/ISA/210) mailed on Nov. 8, 2013, by the European Patent Office as the International Searching Authority for International Application No. PCT/GB2013/051900.

(Continued)

*Primary Examiner* — Elizabeth A Bolden
(74) *Attorney, Agent, or Firm* — Buchanan Ingersoll & Rooney PC

(57) ABSTRACT

A tinted float glass includes a base glass portion comprising:

| | |
|---|---|
| $SiO_2$ | 68-75 wt % |
| $Al_2O_3$ | 0-3 wt % |
| $Na_2O$ | 11-15 wt % |
| $K_2O$ | 0-3 wt % |
| CaO | 6-11 wt % |
| MgO | 2-6 wt % | and a colorant portion comprising iron, cobalt and selenium in the following ranges:

| | |
|---|---|
| $Fe_2O_3$ | 0.30-0.40 wt % |
| $Co_3O_4$ | 46-60 ppm |
| Se | 1-5 ppm |

The tinted float glass is blue-grey in transmitted color, and is suitable for architectural, automotive, and other applications. A particularly preferred embodiment of the glass has a colorant portion comprising 0.31-0.33% $Fe_2O_3$, 51-55 ppm $Co_3O_4$ and 2-4 ppm selenium, together with a light transmission (Ill D65) of 59 to 62%, a dominant wavelength of 482 nm, a color purity of 7 to 8%, and a performance of 3 to 7%; all in a sample 6.0 mm thick. The glass may be coated with a low emissivity coating.

10 Claims, No Drawings

(56) References Cited

U.S. PATENT DOCUMENTS

| | | | |
|---|---|---|---|
| 2005/0020430 A1* | 1/2005 | Thomsen | C03C 3/095 501/64 |
| 2006/0178255 A1 | 8/2006 | Shelestak et al. | |
| 2007/0243993 A1 | 10/2007 | Heithoff et al. | |
| 2009/0025426 A1* | 1/2009 | Landa | C03C 3/095 65/30.13 |
| 2009/0062103 A1 | 3/2009 | Broughton et al. | |
| 2009/0062104 A1 | 3/2009 | Hulme et al. | |

OTHER PUBLICATIONS

Patents Act 1997:Search Report under Section 17 dated Nov. 16, 2012 issued in the corresponding Great Britain Patent Application No. 1212609.0 (1 page).

* cited by examiner

TINTED FLOAT GLASS

The present invention relates to a tinted soda lime silica float glass and a glass composition for making the glass by the float process. More particularly, it relates to a float glass having a particular blue-grey tint. The tinted float glass of the invention is particularly suitable for architectural applications, and is also useful for automotive applications and other applications.

Blue glasses have been known for some time. For instance, U.S. Pat. No. 4,866,010 provides a glass having a distinctive blue colour which is suitable for both automotive and architectural applications, having a light transmission (Ill C) of 54% at 0.25 inch (6.35 mm) thickness, a dominant wavelength of 482 nm and a colour purity of 13%.

However, in recent years, tastes have changed, and more subdued tints are now preferred for both automotive and architectural applications. Furthermore, it is also increasingly required that glass for both markets possesses good solar control properties, i.e. an ability to absorb or reflect the heat energy contained in solar radiation. This heat energy is largely present in the infra-red wavelengths of solar radiation. Thus an effective tinted solar control glass absorbs strongly in the infra-red, and it is known that iron in the ferrous state confers good infra-red absorption on glass. It follows that the infra-red absorption properties of glass may be improved either by increasing the amount of iron in the composition, or by increasing the proportion of iron in the reduced ferrous state in the finished glass, as opposed to the oxidised ferric state. Unfortunately, in practice there is limited scope to follow the latter route, because as the glass becomes more reduced, it also becomes more difficult to melt, being prone to the formation of a silica-rich surface layer which gives rise to inclusions, and to the formation of amber streaks.

If, as is generally the case, it is wished to avoid such melting problems by maintaining the oxidation state of the glass at conventional levels, the iron content will confer a green colour upon the glass, not a blue colour. Additional colourants are then required to produce blue, grey, bronze or indeed other colours of glass. However, these additional colourants tend to detract from the light transmission or solar control properties of the glass, or both. It is therefore a challenge for the glass scientist to develop glasses having both acceptable colour and acceptable solar control properties.

As examples of recently published glasses containing multiple colourants, US 2007/0243993 A1 discloses a low solar absorbing blue glass for architectural purposes, while U.S. Pat. No. 7,932,198 relates to neutral grey glass compositions capable of achieving high light transmittance and acceptable solar properties. These compositions are described as suitable for both automotive and architectural applications. However, the first of these documents relates purely to blue glasses and the second purely to grey glasses.

It has now been realised that a demand exists for a tinted glass of a different hue from the prior art, namely a blue-grey glass of a subdued tint having medium to high light transmission, while still possessing reasonable solar control properties. Surprisingly, despite the poor solar control performance of many known blue glasses, it has been found possible to devise a modified blue-grey tint using certain carefully chosen colourants in particular quantities which do provide acceptable solar control properties.

According to the present invention there is provided a tinted float glass comprising: a base glass portion comprising:

| | |
|---|---|
| $SiO_2$ | 68-75 wt % |
| $Al_2O_3$ | 0-3 wt % |
| $Na_2O$ | 11-15 wt % |
| $K_2O$ | 0-3 wt % |
| CaO | 6-11 wt % |
| MgO | 2-6 wt % | and a colourant portion comprising:

| | |
|---|---|
| $Fe_2O_3$ | 0.30-0.40 wt % |
| $Co_3O_4$ | 46-60 ppm |
| Se | 1-5 ppm |

With this selection of colourants it has been found possible to achieve the desired colour, while still retaining acceptable solar control performance. Preferably the colourant portion consists essentially of these three colourants. In any case, the glass is preferably free from nickel, since this it may be harmful to health, and can also give rise to bloom on the surface of float glass, and inclusions which cause fracture of toughened panes of the glass. The ranges of the colourants have been devised to optimise the shade of colour displayed by the glass, while also optimising light transmission and heat absorption.

In a preferred embodiment of the invention, the colourant portion comprises:

| | |
|---|---|
| $Fe_2O_3$ | 0.30-0.35 wt % |
| $Co_3O_4$ | 48-56 ppm |
| Se | 1-4 ppm |

More preferably, the colourant portion comprises:

| | |
|---|---|
| $Fe_2O_3$ | 0.31-0.33 wt % |
| $Co_3O_4$ | 51-55 ppm |
| Se | 2-4 ppm |

The specified colourants and ranges thereof may yield a tinted float glass having a dominant wavelength of 481 to 484 nm. The colour purity (Ill D65) of the glass may be 5.0 to 12.0%, preferably 6.0 to 10.0%, most preferably 7.0 to 8.0% at a thickness of 6.0 mm. The dominant wavelength defines the hue of the glass, whereas the colour purity measures the chroma, i.e. the intensity of the hue in proportion to the brightness of a similarly illuminated white area. Together they define a small group of blue-grey glasses of attractive appearance.

Alternatively, the colour may be defined in terms of the CIELAB colour space, which is described in more detail below. The glass may have an L* value of 80 to 84, an a* value of −4 to −2, and a b* value of −9 to −5. Preferably, L* value is from 81 to 83, a* is from −3 to −2, and b* is from −7 to −6.

The light transmittance (Ill D65) of the glass at a thickness of 6.0 mm may be 55 to 65%, more preferably 58 to 62%, most preferably 59 to 61%.

It has already been mentioned that it is desirable to maintain the light transmittance of a glass while reducing its transmittance of solar heat. A quantity known as direct solar heat transmission ("DSHT") may be used to measure the latter, according to the standards EN410 or ISO9050: 2003. In the latter, contributions from solar radiation are integrated over the wavelength range 300 to 2500 nm at Air Mass 1.5.

A useful derived measure known as "performance" is defined as the light transmission (Ill A) minus DSHT (ISO9050:2003). The invention provides a tinted float glass having a performance of 1 to 20%, preferably 2 to 10%, most preferably 3.0 to 7.0%.

At least three different scales are used to measure the oxidation state of glass. First, the oxidation state may be described in terms of the percentage of ferrous iron, i.e. the quantity of iron in the ferrous state (but expressed as $Fe_2O_3$) divided by the total quantity of iron (also expressed as $Fe_2O_3$), stated as a percentage. The total quantity of iron is of course the sum of iron in the ferrous state and iron in the ferric state. Alternatively, the ferrous:ferric ratio may be used, also known as the redox ratio; this is the ratio of the amounts of FeO to $Fe_2O_3$. Thirdly the glass redox value may be used, which is similar to the percentage ferrous, except that the quantity of iron in the ferrous state is expressed as FeO rather than $Fe_2O_3$. This gives rise to lower values than the equivalent percentage ferrous; the conversion factor is 1.111.

Preferably the percentage of ferrous iron is in the range 19 to 25%, corresponding to a ferrous:ferric ratio of approximately 0.23 to 0.33, and a glass redox value of approximately 17 to 23. More preferably the percentage of ferrous iron is in the range 20 to 24%, corresponding to a ferrous:ferric ratio of approximately 0.25 to 0.32, and a glass redox value of approximately 18 to 22. In a particularly preferred embodiment, the invention provides a tinted float glass having a colourant portion comprising:

| | |
|---|---|
| $Fe_2O_3$ | 0.31-0.33 wt % |
| $Co_3O_4$ | 51-55 ppm |
| Se | 2-4 ppm | a light transmission (Ill D65) of 59.0 to 62.0%, a dominant wavelength of 482 nm, a colour purity of 7.0 to 8.0% and a performance of 3.0 to 7.0%; all in a glass sheet 6.0 mm thick.

In another preferred embodiment, the invention provides a tinted float glass having a colourant portion comprising:

| | |
|---|---|
| $Fe_2O_3$ | 0.30-0.32 wt % |
| $Co_3O_4$ | 47-49 ppm |
| Se | 2-4 ppm | a light transmission (Ill D65) of 60.0 to 64.0%, a dominant wavelength of 482 nm, a colour purity of 7.0 to 8.0% and a performance of 2.0 to 6.0%; all in a glass sheet 6.0 mm thick.

The invention also relates to sheets, plates, panes, glazings, windows, etc, made from the novel glass herein described. As mentioned at the outset, the novel glass composition of the invention is intended for use in the float process, so the invention also relates to a ribbon of glass of this composition manufactured by the float process, and to a sheet of glass manufactured by the float process.

The tinted float glass of the invention is suitable to be used as a substrate for a coating. Commonly used coatings usually have the effect of changing the apparent colour of a sheet of glass because the coating causes a colour shift when it reflects incident light. Often, the reflected light is of a longer wavelength, giving an undesirable yellow, orange or reddish hue. However, a coated glass comprising a substrate of a sheet of tinted glass according to the invention and a low emissivity coating has been found to be advantageous because the coated glass retains an attractive subdued blue colour in transmission which outweighs any undesirable effect of reflected light on the apparent colour, giving a neutral overall appearance. Moreover, the satisfactory appearance is combined with good thermal performance and reasonable light transmission.

Accordingly, the invention further relates to a sheet of tinted float glass as described herein provided with a low emissivity coating having a total hemispherical emissivity of less than 0.25. The low emissivity coating may be deposited by an online or an offline coating technique.

In online techniques the ribbon of float glass is coated on a continuous basis, as the ribbon advances along the float glass production line. Coating may take place in the float bath, the annealing lehr, or between the two. A preferred online coating technique is a chemical vapour deposition technique employing pyrolysis.

In offline techniques one or more individual sheets of glass are coated in a separate operation, after removal from the float glass production line. A preferred offline coating technique is sputtering, in which atoms are ejected from a solid target material by bombardment of the target with high energy particles. The sputtering process takes place in a high vacuum chamber.

Preferably the low emissivity coating comprises a coating of antimony doped tin oxide deposited on the ribbon of tinted float glass and a coating of fluorine doped tin oxide deposited on top of the antimony doped tin oxide. This coating is deposited by an online technique. The antimony doped tin oxide absorbs solar energy, and the fluorine doped tin oxide coating has the effect of lowering the emissivity of the coated sheet of tinted float glass to less than 0.2, preferably less than 0.15.

Such low emissivity coatings are known from U.S. Pat. No. 6,858,306, the disclosure of which is incorporated by reference. The optical properties of coated glass comprising the tinted float glass of the invention coated with low emissivity coatings of the types herein described have been found to be surprisingly advantageous in terms of both performance and appearance.

The composition of the base glass (i.e. the glass composition with colourants omitted) is within the ranges given in column 2 of Table 1.

TABLE 1

| Base Soda Lime Silica Glass Compositions | | |
|---|---|---|
| 1 Oxide | 2 (wt %) | 3 (wt %) |
| $SiO_2$ | 68-75 | 70-73 |
| $Al_2O_3$ | 0-3 | 0-2 |
| $Na_2O$ | 11-15 | 12.4-14.2 |
| $K_2O$ | 0-3 | 0-1.2 |
| CaO | 6-11 | 7.3-10.0 |
| MgO | 2-6 | 3.6-5.0 |
| $SO_3$ | 0.1-0.4 | 0.17-0.37 |

The composition of soda lime silica glass varies according to manufacturer and manufacturing location. Different manufacturers have differing preferences in terms of the glass properties which are dependent on composition. Also, the raw materials available in the various different glass-making locations around the world differ in terms of their chemical composition. However, the compositions of most commercially available soda lime silica glasses from around the world fall within the ranges given in column 3, and the invention may be used with this range of compositions for the base glass. Preferably the composition is within the ranges given in column 3.

Preferably, a glass according to the invention contains only minimal levels of the following oxides: $As_2O_3$, BaO, $B_2O_3$, BeO, $GeO_2$, $Li_2O$, $P_2O_5$, PbO, $Sb_2O_3$, $SnO_2$, SrO, $TiO_2$, ZnO and $ZrO_2$, for instance trace levels which are inevitably added as part of certain raw materials because they are inherently present as an impurity in those raw materials. The amount of such oxides is preferably less than 1%, more preferably less than 0.5%, and yet more preferably only traces of such oxides are present. Most preferably, the glass is free from each of these oxides, for some of them are harmful to glass furnaces or to the float bath, in particular to the molten tin contained in the bath. Others are regarded as hazardous to human health, so are preferably not included for health and safety reasons.

Preferably, the desired tint is achieved without the use of the following colourants: $CeO_2$, $Cr_2O_3$, CuO, $Er_2O_3$, $MnO_2$, $Nd_2O_3$, NiO and $V_2O_5$, i.e. preferably the glass is also free of these oxides, again except for trace levels which are inevitably added as part of certain raw materials, including the desired colourants, because they are inherently present as an impurity in those raw materials. Should any of these oxides be included in the glass, it would be at a minimal level, e.g. less than 0.5 wt %, more preferably less than 500 parts per million (ppm), still more preferably less than 50 ppm, yet more preferably only at trace level. Some of these colourants are very expensive, e.g. $CeO_2$, $Er_2O_3$ and $Nd_2O_3$, while others have adverse side-effects. For instance, as previously mentioned, the inclusion of nickel oxide is undesirable because it may be harmful to health, being a known carcinogen. The presence of nickel oxide in glass can also give rise to a surface bloom on float glass as a result of chemical reduction in the float bath, and also to nickel inclusions in the glass which can cause toughened glass sheets to shatter.

The invention will now be further described with reference to the following non-limiting Examples, which are tabulated in Tables 2 to 4. Table 3 also contains two comparative examples. In this specification, all compositions and proportions of oxides are given in weight percent, unless indicated to the contrary. It is noted in particular that the proportions of the colourants $Co_3O_4$ and Se are given in parts per million (ppm). It should further be noted that all ranges of values quoted in this specification are inclusive of their end values.

The optical properties of Examples 1 to 5 are provided at 6.0 mm thickness, whereas the optical properties of Example 6 and 7 are provide at 5.9 mm thickness. The colour of the Examples is described in two ways, first according to the CIELAB colour space, and additionally using dominant wavelength and colour purity. The CIELAB colour space is that proposed in 1976 by the CIE (Commission Internationale de l'Eclairage), and is a three-dimensional Cartesian system in which a* is plotted on the x-axis and represents red, with negative values representing green, and b* is plotted on the y-axis to represent yellow, with negative values representing blue. L* denotes lightness and is plotted on the z-axis.

The colour of the Examples is also provided in terms of dominant wavelength (measuring hue) and colour purity (measuring chroma), as may be represented on a chromaticity diagram.

For the avoidance of doubt, the tint of glasses according to the invention described herein is permanent and unvarying, unlike tints produced by the use of thermochromic or photochromic compounds incorporated into the glass for example.

Light transmittance (LT) is provided using two CIE standard illuminants, Ill D65 and Ill A. Direct solar heat transmittance (DSHT) is provided according to the standards EN410 and ISO9050:2003, and ultra-violet transmittance (UV) is also provided according to the latter standard.

As indicated above, the challenge for the glass scientist in this case was to develop glasses having both acceptable colour and acceptable solar control properties. There is a conflict between the measures needed, in terms of the composition, to provide good solar control properties and the measures needed to achieve the colour which it is believed the market desires. For instance, it is the presence of ferrous iron that contributes to increased infra-red absorption, and hence improved control of solar heat transmittance. Therefore, to improve the solar control properties of the glass, the amount of ferrous iron should be increased as much as possible. However, ferrous iron provides only a green colouration. To achieve other colours, it is necessary to add other colourants such as oxides of cobalt, nickel, chromium, copper or manganese, or selenium. Unfortunately, these other colourants detract from light transmittance without contributing to solar control. Glasses with good solar control properties tend to be green in colour, due to the presence of substantial ferrous iron, and so it is unexpected to provide a glass with reasonable solar control properties that is not green but blue-grey in colour.

Referring to the other colourants that may be used, cobalt adds a blue colouration, nickel adds a grey colour, chromium provides either emerald green or yellow according to its oxidation state, copper provides a turquoise colouration, manganese provides either pink or purple, again according to oxidation state, and selenium contributes a pink to red colouration. It is a matter of considerable skill to select the appropriate colourants in the appropriate quantities to achieve the desired colour without impairing solar control properties any more than can be avoided.

Despite these difficulties, with the present invention it has proved possible to provide a glass of a pleasing subdued blue-grey hue, while maintaining reasonable solar control properties.

In Table 2, Example 1 is a glass which was melted and cast in the laboratory, Examples 2 to 4 are glasses which were modelled by computer using software calibrated on the basis of laboratory and production glasses. Examples 5 to 7 are samples from commercial production on a full scale float glass production line. Please see Table 4 for Examples 6 and 7.

Example 1 contains a relatively low level of iron (0.30 wt %), with 46 ppm $Co_3O_4$ and 3 ppm selenium, while Example 2 contains very slightly more iron (0.31%) which produces a measurable improvement in performance.

In Examples 3 and 4 the iron content is increased more substantially, to 0.35 wt % and 0.40 wt % respectively. Example 3 is also a slightly more reduced glass, increasing the proportion of ferrous iron. A small increase in cobalt, and a reduction in selenium result in this glass having a more saturated blue colouration, as is evidence by the colour purity of 9.3%. It should be noted in this context that changes as small as 1 ppm in a colourant result in a perceptible and measurable difference, particularly when the colourant is selenium. As a result of the increased amount of ferrous iron present, and the reduced amount of selenium, this glass has the highest performance of the Examples.

Example 4 contains the highest level of iron, and so cobalt and selenium have been increased to avoid the glass turning green. Furthermore, Example 4 has the same redox as Examples 1 and 2. These measures have had the consequence that the potential improvement in performance due to the higher iron content has been offset by the effect of the other colourants and the more oxidised condition, so the performance is not as high as that of Example 3. However, the colour is more subdued, in fact this Example has the lowest colour purity at 6.1%.

Example 5 is a glass produced on a full scale commercial float glass production line. It contains slightly more iron than Example 2, but has significantly improved performance. This is surprising, given that the cobalt content has also been increased to ensure that the hue remains a pleasing shade of blue-grey. As a result of the increased colourants, there has been a slight reduction in visible light transmission compared with Examples 1 and 2, but the DSHT has been reduced even more, resulting in the improved performance.

TABLE 2

Chemical Analyses & Optical Properties of Examples

|  | 1 | 2 | 3 | 4 | 5 |
|---|---|---|---|---|---|
| $SiO_2$ | 72.4 | 72.4 | 72.4 | 72.4 | 72.4 |
| $Al_2O_3$ | 0.1 | 0.1 | 0.1 | 0.1 | 0.1 |
| $Na_2O$ | 13.6 | 13.6 | 13.6 | 13.6 | 13.6 |
| $K_2O$ | 0.1 | 0.1 | 0.1 | 0.1 | 0.1 |
| CaO | 8.8 | 8.8 | 8.8 | 8.7 | 8.8 |
| MgO | 4.2 | 4.2 | 4.2 | 4.2 | 4.2 |
| SrO | 0.1 | 0.1 | 0.1 | 0.1 | 0.1 |
| BaO | 0 | 0 | 0 | 0 | 0 |
| $TiO_2$ | 0 | 0 | 0 | 0 | 0 |
| $ZrO_2$ | 0.1 | 0.1 | 0.1 | 0.1 | 0.1 |
| $SO_3$ | 0.3 | 0.3 | 0.3 | 0.3 | 0.3 |
| Colourants: | | | | | |
| $Fe_2O_3$ | 0.30 | 0.31 | 0.35 | 0.40 | 0.32 |
| $Co_3O_4$ | 46 ppm | 46 ppm | 47 ppm | 49 ppm | 53 ppm |
| Se | 3 ppm | 3 ppm | 1 ppm | 5 ppm | 3 ppm |
| Glass redox state: | | | | | |
| % ferrous iron | 19.8 | 19.8 | 20.9 | 19.8 | 22.2 |
| ferrous:ferric ratio | 0.25 | 0.25 | 0.26 | 0.25 | 0.29 |
| redox % | 17.8 | 17.8 | 18.8 | 17.8 | 20.0 |
| Optical properties at 6.0 mm thickness, Ill D65, 2° observer: | | | | | |
| L* | 83.0 | 82.9 | 83.3 | 80.3 | 81.8 |
| a* | −2.6 | −2.7 | −3.9 | −2.9 | −2.5 |
| b* | −6.7 | −6.6 | −8.3 | −5.0 | −6.6 |
| LT (Ill D65) % | 62.2 | 62.0 | 62.8 | 57.0 | 60.0 |
| Dominant wavelength | 482 nm | 483 nm | 483 nm | 484 nm | 482 nm |
| Colour purity % | 7.3 | 7.2 | 9.3 | 6.1 | 7.3 |
| Other optical properties at 6.0 mm thickness: | | | | | |
| LT (Ill A) % | 60.9 | 60.6 | 60.9 | 55.9 | 58.8 |
| DSHT (EN410) % | 57.2 | 56.5 | 54.6 | 49.8 | 53.7 |
| DSHT (ISO9050) % | 57.3 | 56.7 | 54.6 | 50.0 | 53.8 |
| UV (ISO9050) % | 34.6 | 34.0 | 35.1 | 26.8 | 33.4 |
| Performance % | 3.6 | 3.9 | 6.3 | 5.9 | 5.0 |

To illustrate the benefits of the new glass in terms of the optical properties achieved, the optical properties of Example 5 were compared with two other commercially available glasses, and the results are shown in Table 3. Comparative Example 1 is a light grey glass for architectural applications, and Comparative Example 2 is a light blue glass, also for architectural applications. Both glasses are from well-known glass manufacturers, and were compared at a thickness of 6.0 mm.

It can be seen that whereas the colour and light transmission of Example 5 are closer to Comparative Example 2 (the blue glass), the DSHT of Example 5 is closer to Comparative Example 1 (the grey glass). In other words, the inventor has succeeded in providing a blue-grey glass with reasonable solar control properties, better than one would expect from interpolating between the known commercially available grey and blue glasses. This is reflected in the fact that Example 5 has a performance of 5.0, which is closer to the performance of the grey glass of Comparative Example 1 at 9.4 than performance of the blue glass of Comparative Example 2 at −0.5.

TABLE 3

Chemical Analysis & Optical Properties of Comparative Examples (6.0 mm thick)

|  | Example 5 | Comparative example 1 (grey) | Comparative example 2 (blue) |
|---|---|---|---|
| $SiO_2$ | 72.4 | 71.9 | 72.7 |
| $Al_2O_3$ | 0.1 | 0.24 | 0.14 |
| $Na_2O$ | 13.6 | 14.1 | 13.8 |
| $K_2O$ | 0.1 | 0.05 | 0.08 |
| CaO | 8.8 | 9.0 | 9.79 |
| MgO | 4.2 | 4.2 | 3.06 |
| SrO | 0.1 | 0 | 0.01 |
| BaO | 0 | 0 | 0.01 |
| $TiO_2$ | 0 | 0.02 | 0 |
| $ZrO_2$ | 0.1 | 0 | 0 |
| $SO_3$ | 0.3 | 0.2 | 0.194 |
| Colourants: | | | |
| $Fe_2O_3$ | 0.32 | 0.29 | 0.177 |
| $Co_3O_4$ | 53 ppm | 38 ppm | 50 ppm |
| Se | 3 ppm | 4 ppm | 4 ppm |
| Glass redox state: | | | |
| % ferrous iron | 22.2 | 22.9 | 23.0 |
| ferrous:ferric ratio | 0.285 | 0.297 | 0.299 |
| redox % | 20.0 | 20.6 | 20.7 |
| Optical properties at 6.0 mm thickness, Ill D65, 2° observer: | | | |
| L* | 81.8 | 83.6 | 83.8 |
| a* | −2.5 | −2.4 | −0.9 |
| b* | −6.6 | −2.1 | −6.2 |
| LT (Ill D65) % | 60.0 | 63.3 | 63.6 |
| Dominant wavelength | 482 nm | 487 nm | 480 nm |
| Colour purity % | 7.3 | 3.0 | 6.1 |
| Other optical properties at 6.0 mm thickness: | | | |
| LT (Ill A) % | 58.8 | 62.6 | 62.7 |
| DSHT (EN410) % | 53.7 | 53.2 | 63.0 |
| DSHT (ISO9050) % | 53.8 | 53.2 | 63.2 |
| UV (ISO9050) % | 33.4 | 30.3 | 41.4 |
| Performance % | 5.0 | 9.4 | −0.5 |

Should a further improvement in solar control performance be desired, the tinted float glass of the invention may be coated with a low emissivity coating. This yields a notable improvement in DSHT. Table 4 provides a comparison of production samples of uncoated and coated tinted float glass, with Example 6 being an uncoated glass from the same production run as Example 5, and Example 7 also being a glass from that production run to which a low emissivity coating has been applied by an online process.

The low emissivity coating applied to Example 7 comprises a coating of antimony doped tin oxide deposited on the ribbon of tinted float glass and a coating of fluorine doped tin oxide deposited on top of the antimony doped tin oxide. This low emissivity coating is in accordance with U.S. Pat. No. 6,858,306. As may be seen from the table, a substantial reduction in DSHT and UV transmission is obtained, together with a reduction in visible light transmission. Critically, the hue of the reflected colour from the coated side of the glass (namely the outer side in Table 4) remains acceptable. Although the colour co-ordinates and dominant wavelength lie just into the yellow part of the spectrum, the effect of the attractive blue-grey transmitted colour on the appearance of the coated glass is such that the overall impression made on an observer when viewing the coated glass glazed in a building is aesthetically pleasing.

TABLE 4

Optical Properties of Uncoated and Coated Examples

|   | Example 6 | Example 7 |
|---|---|---|
| Transmitted colour & light transmission at 5.9 mm thick, Ill D65, 2° Observer: | | |
| L* | 82.2 | 66.6 |
| a* | −2.5 | −2.7 |
| b* | −6.3 | −10.2 |
| LT (Ill D65) % | 60.6 | 36.1 |
| Dominant wavelength | 482 nm | 481 nm |
| Colour purity % | 6.9 | 12.6 |
| Other optical properties at 5.9 mm thickness (in transmission): | | |
| LT (Ill A) % | 59.4 | 34.9 |
| DSHT (EN410) % | 54.4 | 29.4 |
| DSHT (ISO9050) % | 54.4 | 29.1 |
| UV (ISO9050) % | 33.8 | 21.2 |
| Performance % | 5.0 | 5.8 |
| Reflected colour - outer side, Ill D65, 2° Observer: | | |
| L* | 29.6 | 35.1 |
| a* | −0.6 | −1.8 |
| b* | −2.3 | 3.1 |
| Dominant wavelength | 481 nm | 567 nm |
| Colour purity % | 5.2 | 6.1 |
| Reflected colour - inner side, Ill D65, 2° Observer: | | |
| L* | 29.6 | 29.2 |
| a* | −0.6 | −1.9 |
| b* | −2.3 | −2.2 |
| Dominant wavelength | 481 nm | 486 nm |
| Colour purity % | 5.2 | 6.3 |

The invention claimed is:

1. A tinted float glass having a blue-grey colour, said tinted float glass comprising:

a base glass portion comprising:

| $SiO_2$ | 68-75 wt % |
|---|---|
| $Al_2O_3$ | 0-3 wt % |
| $Na_2O$ | 11-15 wt % |
| $K_2O$ | 0-3 wt % |
| CaO | 6-11 wt % |
| MgO | 2-6 wt % | and a colourant portion comprising:

| $Fe_2O_3$ | 0.30-0.35 wt % |
|---|---|
| $Co_3O_4$ | 48-56 ppm |
| Se | 1-4 ppm | wherein the tinted float glass has a dominant wavelength of 481 to 484 nm and a colour purity (Ill D65) of 6.0 to 10.0% at a thickness of 6.0 mm.

2. A tinted float glass as claimed in claim 1 comprising a colourant portion comprising:

| $Fe_2O_3$ | 0.31-0.33 wt % |
|---|---|
| $Co_3O_4$ | 51-55 ppm |
| Se | 2-4 ppm. |

3. A tinted float glass as claimed in claim 1 having a colour purity (Ill D65) of 7.0 to 8.0%.

4. A tinted float glass as claimed in claim 1 having a performance (defined as light transmission (Ill A) minus direct solar heat transmission (ISO9050) at a thickness of 6.0 mm) of 1 to 20%.

5. A tinted float glass as claimed in claim 4 having a performance of 2 to 10%.

6. A tinted float glass as claimed in claim 5 having a performance of 3.0 to 7.0%.

7. A tinted float glass as claimed in claim 1 having an L* value of 80 to 84, an a* value of −4 to −2, and a b* value of −9 to −5, in terms of the CIELAB colour space.

8. A tinted float glass as claimed in claim 7 having an L* value of 81 to 83, an a* value of −3 to −2, and a b* value of −7 to −6.

9. A tinted float glass as claimed in claim 1 provided with a low emissivity coating having a total hemispherical emissivity of less than 0.25.

10. A tinted float glass having a blue-grey colour, said tinted float glass comprising:

a base glass portion comprising:

| $SiO_2$ | 68-75 wt % |
|---|---|
| $Al_2O_3$ | 0-3 wt % |
| $Na_2O$ | 11-15 wt % |
| $K_2O$ | 0-3 wt % |
| CaO | 6-11 wt % |
| MgO | 2-6 wt % | and a colourant portion comprising:

| $Fe_2O_3$ | 0.31-0.33 wt % |
|---|---|
| $Co_3O_4$ | 51-55 ppm |
| Se | 2-4 ppm | wherein the tinted float glass composition has a light transmission (Ill D65) of 59.0 to 62.0%, a dominant wavelength of 482 nm, a colour purity of 7.0 to 8.0% and a performance (defined as light transmission (Ill A) minus direct solar heat transmission (ISO9050)) of 3.0 to 7.0%; all in a sample 6.0 mm thick.

* * * * *